3,687,801
ADHESIVE SYSTEM
Richard Derby, Huntingdon Valley, Pa., assignor to Rohm and Haas Company, Philadelphia, Pa.
No Drawing. Filed Aug. 24, 1970, Ser. No. 66,628
Int. Cl. B32b 27/30, 27/38, 27/40
U.S. Cl. 161—184
6 Claims

ABSTRACT OF THE DISCLOSURE

An adhesive system comprising a solution of a particular addition polymer and a particular type of polyisocyanate, a method of laminating an acrylic film to a cellulosic substrate using said adhesive system and the laminated product.

---

Cellulosic substrates such as hardboard, particle-board, plywood and the like have many desirable characteristics which could make them quite useful for exterior uses such as siding. However, such use requires the application to the cellulosic substrate of some type of continuous protective coating both for the purpose of enhancing appearance and to protect the siding material from the elements, e.g., rain, sunlight, etc. The usual coating, paint, does not permit the application of the protective coating in a single operation and suffers from problems such as chalking, discoloration, degradation from ultraviolet light. It would be desirable to be able to apply to cellulosic substrates a protective film in order to improve the appearance and durability of the substrates. Acrylic films, in particular, have advantageous characteristics that would make them desirable for this purpose. However, acrylic film/cellulosic substrate laminates must possess exceptional peel resistance and at the same time be able to withstand severe impacts. The initial adhesion of the film to the substrate and the initial appearance of the film should be retained for a period of twenty to thirty years. A number of tests have been developed to provide a basis for predicting the long-term behavior of laminates. While there are a great number of commercially available adhesives for use with various film materials, it is extremely difficult to find any that can be used to prepare an acrylic film/cellulosic substrate laminate that possesses the necessary combination of initial and accelerated aging properties.

An adhesive system has now been found which is particularly suitable for bonding acrylic films to cellulosic substrates. Basically, this adhesive system comprises two components:

(A) An addition polymer of a major amount of lower alkyl acrylate, a minor amount of methyl methacrylate and from 2 to 10 weight percent of glycidyl acrylate and/or methacrylate, said polymer having a glass transition temperature in the range of 0° C. to 30° C. and a molecular weight such that the intrinsic viscosity in ethylene dichloride is greater than 0.30 deciliters/gram up to 1.2 deciliters/gram, and (B) From 5 to 100 parts by weight per hundred parts of A of an aromatic polyisocyanate composition characterized by the formula:

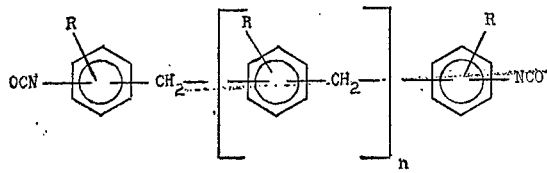

wherein $n$ is any number from 0 to 15 and each R is separately selected from the group consisting of hydrogen, lower alkyl and lower alkoxy. As used in the above description "lower alkyl" and "lower alkoxy" contemplate groups containing up to 4 carbon atoms, e.g., from methyl and methoxy to butyl and butoxy.

A solution of this adhesive in nonreactive solvent has a suitable viscosity/solids relationship so that it can be readily roll coated, depositing a sufficient volume of adhesive, in a maximum of two passes, without excessive patterning. The pot-life of the adhesive solution is long enough to ensure proper performance for at least the length of an average working day (ca. 8 hour). In addition, the adhesive is not overly sensitive to the shearing forces encountered during roll coating. The adhesive reaches the desired level of dryness under conditions that correspond to those normally encountered in commercial operations (e.g., 1 minute at 250° F.). It is not necessary to heat the adhesive above 300° F. to activate it. The adhesive is stable to direct infrared radiation. Laminates with good adhesion can be produced with the adhesive even at moderate lamination pressures, i.e., less than 100 p.s.i.

Acrylic film/cellulosic substrate laminates produced with this adhesive exhibit some initial bonding while still warm and develop a demonstratable bond (remove wood fiber when film is peeled) by the time the system has reached thermal equilibrium. After about one week the laminates reach optimum bond strength and exhibit substantial peel resistance. After standing for one day, the laminates with stand a minimum of twenty-four hours immersion in boiling water of 100 hours immersion in room temperature water without demonstrating significant delamination, film shrinkage or blistering, and retain at least enough adhesion so that some fiber is removed from the cellulosic substrate when a section of the film is peeled off.

The addition polymers

Typically, the useful polymers contain from about 25% up to about 45% by weight methyl methacrylate (MMA). The "harder" the polymer (the higher the MMA content), the less peelable the bond formed by the adhesive.

The exact function of the glycidyl acrylate or methacrylate is not entirely certain but it appears that it interacts in some manner with the polyisocyanate of the adhesive. Omission of this component results in an adhesive which fails to give the type of laminate necessary for commercial use. Reduction of the glycidyl component reduces the peel resistance of the laminate. In general, the amount should range from about 3% to 5% by weight.

The precise identity of the lower alkyl acrylate is not of critical significance provided the glass transition temperature of the polymer is within the prescribed range. Thus, ethyl acrylate and butyl acrylate can be interchanged without changing polymer performance provided the polymers in each case exhibit the same glass transition temperature. In general, the acrylate component comprises from about 50% to about 75% by weight of the polymer.

The effect of molecular weight is not completely defined. It appears, however, that the higher the molecular weight, the better the polymer performs in most formulations.

The solvent employed in the preparation of the polymer definitely affects polymer performance. Thus, where polymers were prepared from identical monomer charges in different solvents, viz., toluene/ethyl acetate, 1:1 and toluene/methyl ethyl ketone, 1:1, the former had a higher intrinsic viscosity after isolation and resulted in laminates having better performance in boiling water; the latter gave rise to laminates that were less peelable.

The isocyanate

The aromatic polyisocyanates useful for the purposes of the present invention typically range from diphenyl methane-p, p'-diisocyanate ($n=0$) to polymethylene polyphenyl isocyanates in which $n$ of the previously defined formula may be 3, 4, 5, etc. up to 15. In fact, these materials are generally obtained as mixtures; typical commercially available materials have values such as 1.23, 1.36, 1.76, etc. The preferred average $n$ value is 1.6 to 2.0.

The inert solvent

In general, the same solvents utilized in producing the addition polymer can be utilized in preparing the solvent. However, for ease of applications at a reasonable solids level, the adhesive should contain a solvent which reduces viscosity rapidly with minimum dilution. The preferred solvent system comprises methyl ethyl ketone/methyl isobutyl ketone/toluene/ methyl Cellosolve acetate (40/25/10/25). In general, the optimum solvent system will be determined on the basis of the particular polymer and isocyanate combination utilized and the intended method of adhesive application.

Specific compositions

The preferred addition polymers within the scope of this invention are prepared from methyl methacrylate (MMA), ethyl acrylate (EA) or butyl acrylate (BA), and glycidyl methacrylate (GMA). The following table summarizes some of these useful compositions

TABLE I

| Polymer compositions, weight percent | | | Estimated intrinsic viscosity |
|---|---|---|---|
| MMA | EA | GMA | |
| 29 | 66 | 5 | 0.61 |
| 30 | 66 | 4 | 0.57 |
| 30 | 66 | 4 | 1.0 |
| 36 | 60 | 4 | 0.57 |
| 40 | 56 | 4 | |
| 45 | 51 | 4 | 0.57 |

For the purposes of the present invention, those polymers in which butyl acrylate is substituted in whole or in part for the ethyl acrylate exhibit essentially the same properties as those in the table.

Each of the above-described polymers is mixed with one or more of each of the previously described specific isocyanates in proportions varying by increments, of 5 parts per hundred, from 5 to 50 parts of isocyanate per hundred parts of addition polymer, and in each of the previously described specific solvents at solids levels of 20%, 25%, 30% and higher.

The preferred adhesive system for the purposes of the present invention comprises 100 parts by weight of an addition polymer comprising 30–36% MMA/66–60% EA/4% GMA and 20–50 parts by weight of the previously defined polyisocyanate wherein $n$ is 1.6 to 2.0, particularly when dissolved at about 30% solids in the preferred solvent system defined previously herein.

The acrylic film

The adhesive of the present invention is broadly applicable for bonding substantially all acrylic films to a cellulosic substrate. In particular, however, it is applicable to the bonding of films such as:

(a) Acrylic film described and claimed in U.S. 3,415,796;

(b) Binary and/or ternary laminates as described and claimed in U.S. 3,473,996; in this case the unbonded acrylic surface of the laminate is bonded to the cellulosic substrate;

(c) films as described in Ryan applications Ser. No. 526,038 (abandoned) and Ser. No. 735,191, now U.S. Pat. No. 3,562,235;

(d) Films of the type described in Dunkelberger Ser. No. 877,847 formed from a polymer composition comprising a first-stage, rubbery, cross-linked emulsion polymer of a $C_1$ or $C_2$ acrylate or mixtures thereof with each other or with certain other-specified monomers, a second-stage thermoplastic polymer emulsion polymerized directly on the said first stage and consisting essentially of at least 25% of the first-stage monomers and up to 75% of a $C_1$ to $C_4$ methacrylate, and a final-stage thermoplastic polymer emulsion polymerized on the first and second stages which consists essentially of at least 90% by weight of a $C_1$ to $C_4$ alkyl methacrylate and the balance any of a number of various monomers such as $C_1$ to $C_8$ alkyl acrylates, acrylic acid, methacrylic acid, etc.; and (e) Film of the type described in Dunkelberger Ser. No. 27,995 which typically is formed from latex particles wherein the particles individually consist essentially of from about 40% up to about 45% by weight of a first-stage, rubbery, cross-linked polymer having a Tg below about 10° C. and the balance a second-stage, thermoplastic polymer having a Tg of at least 60° C. polymerized directly thereon and attached thereto, the heteropolymer particles being formed by emulsion polymerizing, to an average particle size of from about 1100 A. to about 1200 A., a monomer mixture consisting essentially of butyl acrylate, from 0.5 to 1.5% by weight of butylene glycol diacrylate, and from about 0.7 to 1.0% by weight of allyl methacrylate to form the first-stage polymer. The relative proportions of diacrylate and methacrylate are sufficient to substantially uniformly crosslink the principal monomer system and provide a level of attachment of the first-stage polymer to the second-stage polymer of from about 25% to about 35%. The second-stage polymer is attached to the first-stage polymer particles by emulsion polymerizing to an average molecular weight in the range of 100,000 to 150,000, and in the presence of the particles a monomer system consisting essentially of at least 80% by weight of methyl methacrylate, and the balance butyl acrylate.

The disclosure of the foregoing patents and applications with regard to films is incorporated herein. It will be recognized that the term "acrylic" is used in the broad sense to include acrylates and methacrylates. Each of the specific film materials described in the examples of the above-identified patents and applications can be treated advantageously with each of the earlier described adhesive system for bonding to a cellulosic substrate.

Optional additives

The inclusion of various catalysts such as Zinc Octoate in the adhesive system, while possibly providing some minor advantages, significantly reduced the adhesive pot-life and made lamination control increasingly difficult.

It was found, however, that, when compounds that might best be characterized as hydroxyl containing and of small molecule size were included in the adhesive, an improvement in peel resistance resulted. For example, when water was added at levels below or equivalent to the glycidyl methacrylate content, the peelability after boil decreased and the dry peel resistance (i.e., resistance to peel after one week at ambient conditions) increased. Further increase in water content tends to reduce this effect. Propylene glycol and n-butanol similarly improve the boil characteristics with the latter being particularly superior. Maleic anhydride and sodium methoxide, while increasing peel resistance, greatly decrease boiling water resistance. The adhesive of the present invention can accommodate fillers and pigments if desired, for example, to obtain opacity when thin films are to be laminated. Thus, 8% carbon black, 5% Cab-O-Sil M5, or 10% titanium dioxide can be added without any apparent reduction in adhesive properties. The resistance to peeling can further be enhanced by inclusion of, for example, 10 to 25 p.p.h. of terpolymer such as, for example, one comprising 86% vinyl chloride/13% vinyl acetate/1% maleic acid with an estimated intrinsic viscosity of 0.53; 25 p.p.h. of a resin comprising 97.7% MMA/2.0% N-[β-(α-methacryloxyacetamido)ethyl]-N,N'-ethyleneurea/0.3% methacrylic acid; 10 p.p.h. of phenolic resins such as Catalin 9474; 25 p.p.h. of a terpolymer comprising 70% MMA/ 20% EA/10% hydroxyl propyl methacrylate. In addition to the foregoing, replacement of minor amounts of the specified polyisocyanate of the adhesive composition with dianisidine diisocyanate on a two for one basis significantly improved the ultimate adhesion of the adhesive composition. In the preferred adhesive, 5 parts of the polyisocyanate can be advantageously replaced by 10 parts of the dianisidine diisocyanate compound.

Cellulosic substrate

There appears to be no substantial criticality with regard to the particular cellulosic substrate utilized with the adhesive and acrylic film. Any of the following commercially available cellulosic substrates may be laminated to any of the previously described acrylic films by means of the adhesive composition of the present invention:

(a) Masonite Colorlok X-90
(b) U.S. Plywood Catawba Hardboard
(c) Georgia-Pacific—Coos Bay Hardboard
(d) Ford Products Co. Hardboard
(e) Isorel Hardboard
(f) Armstrong Hardboard
(g) U.S. Gypsum—Duron Hardboard
(h) Masonite Tempered Presdwood It should be recognized, however, that within the scope of the adhesive composition variations can be made with regard to viscosity, solvent, molecular weight, etc. in order to specifically adapt the adhesive to the particular characteristics of the substrate. This, of course, is within the ordinary skill of the art.

Lamination conditions

An increase in adhesion and/or an increase in peel resistance is generally obtained as the number of adhesive coats is increased, but this is generally accompanied by a decrease in blister resistance. Where adequate initial adhesion is realized with only one coat of adhesive, the best all-around balance of laminate properties is obtained, especially for reactivation temperatures in the range of 300° F.

At a lamination temperature of 250° F. an increase in line speed from four to eight feet-per-minute caused a decrease in adhesion which was, however, more than compensated by an increase in peel resistance and a decreasing tendency to blister during boil. At 300° F., differences in line speed have less influence on the laminate properties. When cold nip rolls are employed, laminates prepared at 250 and 300° F. are generally indistinguishable. However, laminates prepared at 300° F. are slightly superior to those reactivated at 250° F. and in most instances have increased peel resistance. Laminates prepared below 250° F. are too readily peelable. With lamination temperatures in the range of 250° F., it is difficult to differentiate between laminates prepared with hot or cold nip rolls. However, at 300° F. laminates are generally found to be more peel resistant if hot nips had been employed. Although, the use of cold nip rolls can lead to laminates with poor edge adhesion, the general overall adhesion improves. In some instances, the sanding of hardboard panels prior to adhesive coating improves the overall properties of subsequently prepared laminates.

Typical example

A polymer composition comprising 30% methyl methacrylate, 66% ethyl acrylate, and 4% glycidyl methacrylate is prepared in reflux in ethyl acetate or methyl ethyl ketone using benzoyl peroxide as an initiator. In the normal procedure, the monomer mixture containing the peroxide is added to the refluxing solvent over a period of about two hours. At the conclusion of polymerization, the polymer is diluted with toluene to 40% solids. To 100 parts of this polymer are added 25 parts polymethylene polyphenyl isocyanate mixture having an average $n$ value of about 1.76, (Boscodur No. 4, U.S.M. Chemical Co.). The mixture is diluted to 30% solids; the solvent composition comprises 40% methyl ethyl ketone, 25% methyl isobutyl ketone, 10% toluene and 25% methyl Cellosolve acetate. The adhesive can be applied to the cellulosic substrate, e.g., Masonite Tempered Presdwood using either a roll coater or a wire wound rod. The panels are then convection dried by passage through a suitable oven. The adhesive is reactivated by a bank of infrared heaters and the panel and film are mated in a set of hot or cold pressure nip rolls at a temperature of 250° F. The film is, for example, that defined in Example I of the aforementioned Ryan application Ser. No. 735,191. The resulting laminate has excellent peel resistance, boiling water resistance, and the other desirable laminate characteristics earlier described herein. Essentially equivalent results can be obtained with any combination of the films, substrates and adhesives described in the several sections preceding.

What is claimed is:

1. An adhesive consisting essentially of a solution in a non-reactive, volatile solvent of a mixture of:

(A) An addition polymer of a major amount of lower alkyl acrylate, a minor amount of methyl methacrylate and from 2 to 10 weight percent of glycidyl acrylate and/or methacrylate, said polymer having a glass transition temperature in the range of 0° C. to 30° C. and a molecular weight such that the intrinsic viscosity in ethylene dichloride is greater than 0.30 deciliters/gram up to 1.2 deciliters/gram, and (B) From 5 to 100 parts by weight per hundred parts of A of an aromatic polyisocyanate composition characterized by the formula:

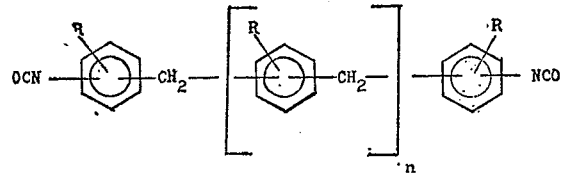

wherein $n$ is any number from 0 to 15 and each R is separately selected from the group consisting of hydrogen, lower alkyl and lower alkoxy.

2. An adhesive composition in accordance with claim 1 wherein said addition polymer comprises from about 25% to 45% by weight of methyl methacrylate, from about 50% to about 75% by weight of lower alkyl acrylate and from about 3% to about 5% by weight of glycidyl methacrylate.

3. An adhesive composition in accordance with claim 1 wherein said polyisocyanate is a polymethylene polyphenyl isocyanate in which $n$ as defined in claim 1 is in the range of 1.6 to 2.0.

4. An adhesive composition in accordance with claim 1 wherein said addition polymer comprises from about 25% to 45% by weight of methyl methacrylate, from about 50% to about 75% by weight of lower alkyl acrylate and from about 3% to about 5% by weight of glycidyl methacrylate and wherein said polyisocyanate is a polymethylene polyphenyl isocyanate in which $n$ as defined in claim 1 is in the range of 1.6 to 2.0.

5. A method for forming a peel resistant laminate which comprises coating a surface of a cellulosic substrate with the adhesive of claim 1 and pressing an acrylic film substantially uniformly against the adhesive-coated surface of said substrate at a laminating temperature in the range of from about 250° F. to about 300° F.

6. The laminated product produced in accordance with claim 5.

References Cited

UNITED STATES PATENTS

| | | | |
|---|---|---|---|
| 2,825,672 | 3/1958 | Koblitz et al. | 161—184 |
| 3,011,909 | 12/1961 | Hart et al. | 260—32.1 X |
| 3,012,984 | 12/1961 | Hudson | 260—31.2 N |
| 3,038,826 | 6/1962 | Medl | 156—330 X |
| 3,058,947 | 10/1962 | Fryling et al. | 260—31.4 EP |
| 3,060,148 | 10/1962 | Evans et al. | 260—32.2 X |
| 3,424,719 | 1/1969 | Masters | 260—31.2 N |
| 3,425,988 | 2/1969 | Gorman et al. | 260—31.2 N |
| 3,532,652 | 10/1970 | Zang et al. | 161—190 X |
| 3,367,992 | 2/1968 | Beaden | 161—184 X |

HAROLD ANSHER, Primary Examiner

U.S. Cl. X.R.

156—330, 331; 161—190, 251; 260—31.2 N, 31.4 EP, 32.3, 32.4